(12) United States Patent
Schoppman et al.

(10) Patent No.: US 7,667,213 B1
(45) Date of Patent: Feb. 23, 2010

(54) THERMAL IMAGING SYSTEM

(76) Inventors: Edward Donald Schoppman, 5503 Effieham St., Oak Ridge, NC (US) 27310; Charlie Grady Guinn, 487 Scott Crossing Rd., Lewistown, MT (US) 59457

( * ) Notice: Subject to any disclaimer, the term of this patent is extended or adjusted under 35 U.S.C. 154(b) by 20 days.

(21) Appl. No.: 12/052,792

(22) Filed: Mar. 21, 2008

(51) Int. Cl.
*F41J 1/00* (2006.01)
(52) U.S. Cl. .................................. 250/493.1
(58) Field of Classification Search ............... 250/330, 250/332, 338.1, 495.1, 504 R, 493.1
See application file for complete search history.

(56) References Cited

U.S. PATENT DOCUMENTS

| | | | |
|---|---|---|---|
| 4,260,160 A | 4/1981 | Ejnell et al. | 273/408 |
| 4,346,901 A | 8/1982 | Booth | 273/408 |
| 4,422,646 A | 12/1983 | Rosa | 273/348.1 |
| 4,546,983 A | 10/1985 | Rosa | 273/348.1 |
| 4,659,089 A | 4/1987 | Rosa | 273/348.1 |
| 4,792,142 A | 12/1988 | Davies | 273/348.1 |
| 5,065,032 A | 11/1991 | Prosser | 250/495.1 |
| 5,066,019 A * | 11/1991 | Dean et al. | 273/348.1 |
| 5,319,213 A | 6/1994 | Watkins et al. | 250/493.1 |
| 5,751,830 A * | 5/1998 | Hutchinson | 382/103 |
| 5,858,496 A * | 1/1999 | Fisher et al. | 428/44 |
| 5,969,369 A | 10/1999 | Fogarty | 250/495.1 |
| 6,337,475 B1 | 1/2002 | Migliorini | 250/208.1 |
| 6,489,616 B2 * | 12/2002 | Giedd | 250/338.1 |
| 6,767,015 B1 | 7/2004 | Parsley | 273/348.1 |
| 7,092,007 B2 * | 8/2006 | Eguchi et al. | 348/148 |

* cited by examiner

*Primary Examiner*—David P Porta
*Assistant Examiner*—Marcus H Taningco

(57) ABSTRACT

A thermal imaging system. The thermal imaging system includes a thermal image generator, the thermal image generator including a structure having a surface having at least three heating zones; a controller for varying the thermal output of the thermal image generator; and a thermal image detector.

4 Claims, 8 Drawing Sheets

THERMAL IMAGING SYSTEM

BACKGROUND OF THE INVENTION (1) Field of the Invention

The present inventions relate generally to thermal imaging systems and, more particularly, to a thermal imaging system having an improved thermal image generator.

(2) Description of the Prior Art

Infrared and other thermal-related detection devices have become increasingly important, particularly in combat. Since technology facilitates the detection of heat in the battleground, there is an increasing need for training soldiers in identifying enemy versus friendly combatants. One of the challenges facing soldiers in the field who employ heat detection devices such as infrared detectors, is that the identity of a target is not readily discernible based on the mere existence of a heat signature. For example, animals, vehicles and random mechanical devices can all emit heat and therefore present themselves as a potential target.

The detection of humans is not necessarily straight forward either. A human body emits various levels of heat depending on the area of the body. For example, the top of the head emits less heat than the armpit region. These variations in temperature can make the heat signature less than straight forward. Moreover, human heat signatures vary according to the ambient temperature. While one would expect more heat to be emitted in higher ambient temperatures, it is also found that certain regions of the body emit a disproportionally high amount of heat in higher temperatures. Accordingly, a human heat signature in one ambient temperature may vary greatly from an emitted heat signature in another temperature.

While it is beneficial to train soldiers to detect human versus non-human heat signatures, and to train soldiers in detecting human heat signatures in various ambient temperatures, it is also critically important to train soldiers in differentiating one human heat signature from another. When a human that is being detected by infrared detectors is holding or carrying a weapon or other equipment, the resulting heat signature is characterized by a "cold spot" in the image, which corresponds with where the equipment is blocking the body heat. This characteristic in the heat signature is useful in identifying friendly versus enemy soldier where the object causing the heat interference is characteristic to either the friendly or the enemy soldier. For example, a soldier carrying an AK-47 or RPG could be differentiated from U.S. or NATO soldiers who carry different weaponry and other equipment.

Thus, there remains a need for a new and improved thermal imaging system having a thermal image generator including a structure having a surface with at least three heating zones while, at the same time, is adapted to varying the thermal output of the thermal image generator.

SUMMARY OF THE INVENTION

The present inventions are directed to a thermal imaging system. The thermal imaging system includes a thermal image generator, the thermal image generator including a structure having a surface having at least three heating zones; a controller for varying the thermal output of the thermal image generator; and a thermal image detector.

In one embodiment of the thermal imaging system, the device is capable of generating a realistic human thermal signature. This is accomplished using a powered device that includes a silhouette-shaped target, and a controller. The silhouette is generally divided into head, shoulder and body zones, with each zone having different sized wires associated therewith. When power is applied to the system, the zones emit heat according to their wire size, thereby creating heat differentials among the zones. These differentials act together to closely emulate a human thermal signature. In addition, the device may employ the controller to adjust power delivery according to ambient temperature, thereby emulating a human thermal signature at various outside temperatures.

Accordingly, one aspect of the present inventions is to provide a thermal imaging system including a thermal image generator; and a controller for varying the thermal output of the thermal image generator.

Another aspect of the present inventions is to provide a thermal image generator for a thermal imaging system, the thermal image generator including a structure having a surface having at least three heating zones.

Still another aspect of the present inventions is to provide a thermal imaging system including a thermal image generator, the thermal image generator including a structure having a surface having at least three heating zones; a controller for varying the thermal output of the thermal image generator; and a thermal image detector.

These and other aspects of the present inventions will become apparent to those skilled in the art after a reading of the following description of the preferred embodiment when considered with the drawings.

DESCRIPTION OF THE PREFERRED EMBODIMENTS

Figure 1:
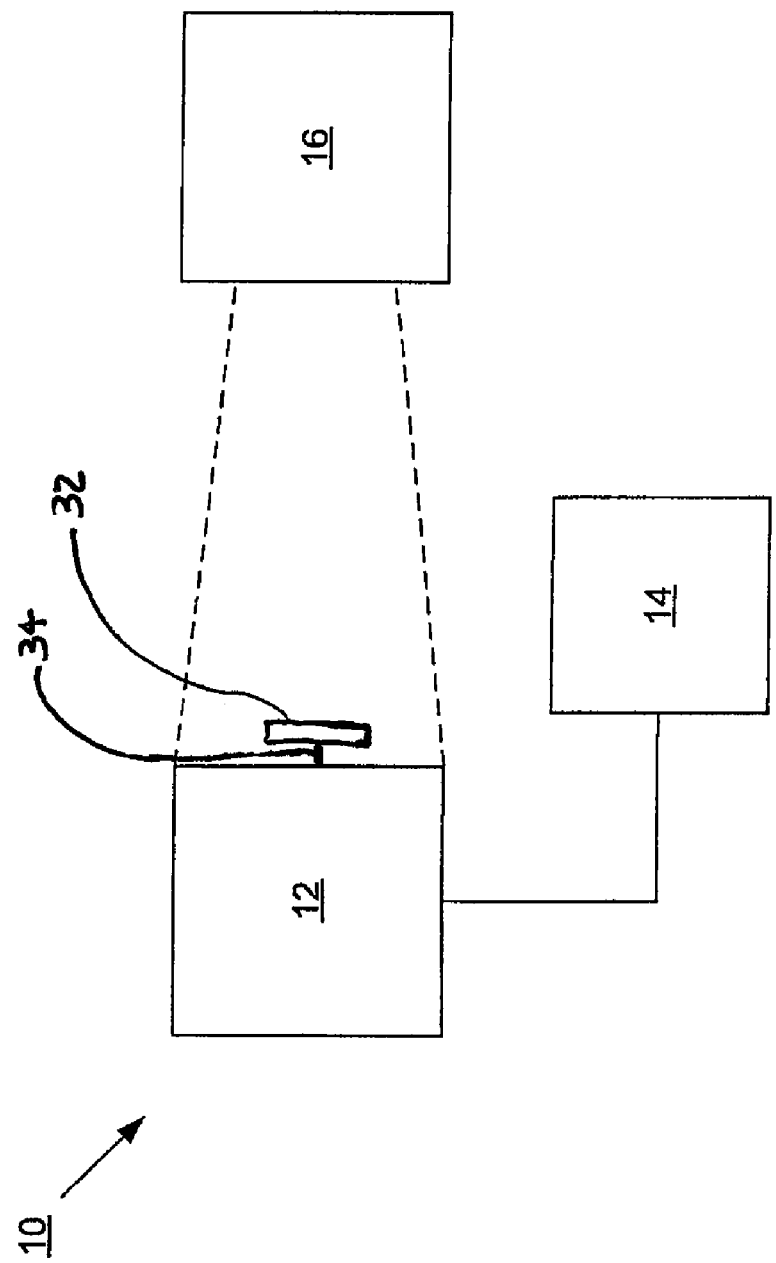
FIG. 1 is a block diagram illustrating a thermal imaging system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a thermal imaging system, generally designated 10, is shown constructed according to the present invention. The thermal imaging system 10 includes three major sub-assemblies: a thermal image generator 12; a controller 14 for varying the thermal output of thermal image generator 12; and a thermal image detector 16. Detector 16 is within the "vision" of thermal image generator 12, as depicted by the broken vision lines connecting detector 16 to thermal image generator 12.

Thermal image detector 16 may be so-called night vision goggles, or other versions of an infrared detector. Most preferably, detector 16 is mounted to a weapon. This may be obtained from Night Vision Systems of Allentown, Pa., under model number MX-2. Most preferably, detector 16 detects mid to long infrared waves, and is portable. Mid to long infrared waves, for purposes of this invention, are considered to be between about 3 microns and about 12 microns. Portable, as used herein, refers to suitable size, which would reasonably lend itself to use in the field.

Preferably, controller 14 has VAC output, most preferably between about 2 and 30 VAC. Preferably, controller 14 is a voltage controller, such as a rheostat, and preferably a digital incandescent dimmer such as a Leviton® MDI06-1LW available from Leviton Mfg. Company of Little Neck, N.Y. Controller 14 is preferably an automatic controller for varying the thermal output of thermal image generator 12 with respect to ambient temperature. Most preferably, controller 14 includes a conventional closed loop temperature sensor which may be a thermistor, a RTD or a thermocouple for measuring the ambient temperature. The most preferred controller is a Model CB-120 available from Loose Cannon Engineering, Inc. of Oak Ridge, N.C.

Preferably, thermal image generator 12 forms a target silhouette. Most preferably, this target silhouette is a human silhouette. Preferably, thermal image generator 12 includes overlay 32, such as a distinctive replica of a small arm, RPGs, conventional tool, conventional equipment or combinations thereof. Most preferably, overlay 32 is a passive overlay, insofar as it is not powered, nor does it emit heat or infrared light actively in any wavelength. Most preferably, overlay 32 includes at least one thermal stand-off 34 between the surface of thermal image generator 12 and overlay 32. This may be obtained from W.W. Granger of Billings, Mont. as plastic rivet 2HY62. In the most preferred embodiment, thermal stand-off 34 is attached to overlay 32, as opposed to thermal image generator 12.

As will be further described below, the thermal image generator 12 for thermal imaging system 10 preferably includes a structure having at least three heating zones. These heating zones may be at different temperatures, but are not necessarily. Thermal image generator 12 includes heat grid 22 having a plurality of horizontal wires 37 and vertical wires 38. Preferably, heat grid 22 is asymmetrical, most preferably, generally rectangular with the width greater than the height, preferably a vertical displacement of about 1 inch and a horizontal displacement of about ½ inch. Heat grid 22 preferably includes first foil 24 and second foil 26. Preferably, first foil 24 and second foil 26 are oriented to follow the outline of heat grid 22. First foil 24 and second foil 26 are properly considered a bus bar insofar as they provide power to heat grid 22. Heat grid 22 preferably has a watts per inch value of between about 0.04 to about 0.05; 0.05 to 0.07; and 0.07 to 0.08 for zones 20", 20' and 20'", respectively. Accordingly, the lowest watts per inch is found in shoulder zone 20", the middle watts per inch is associated with body zone 20', and the highest watts per inch values correlate with face zone 20'".

Figure 2:
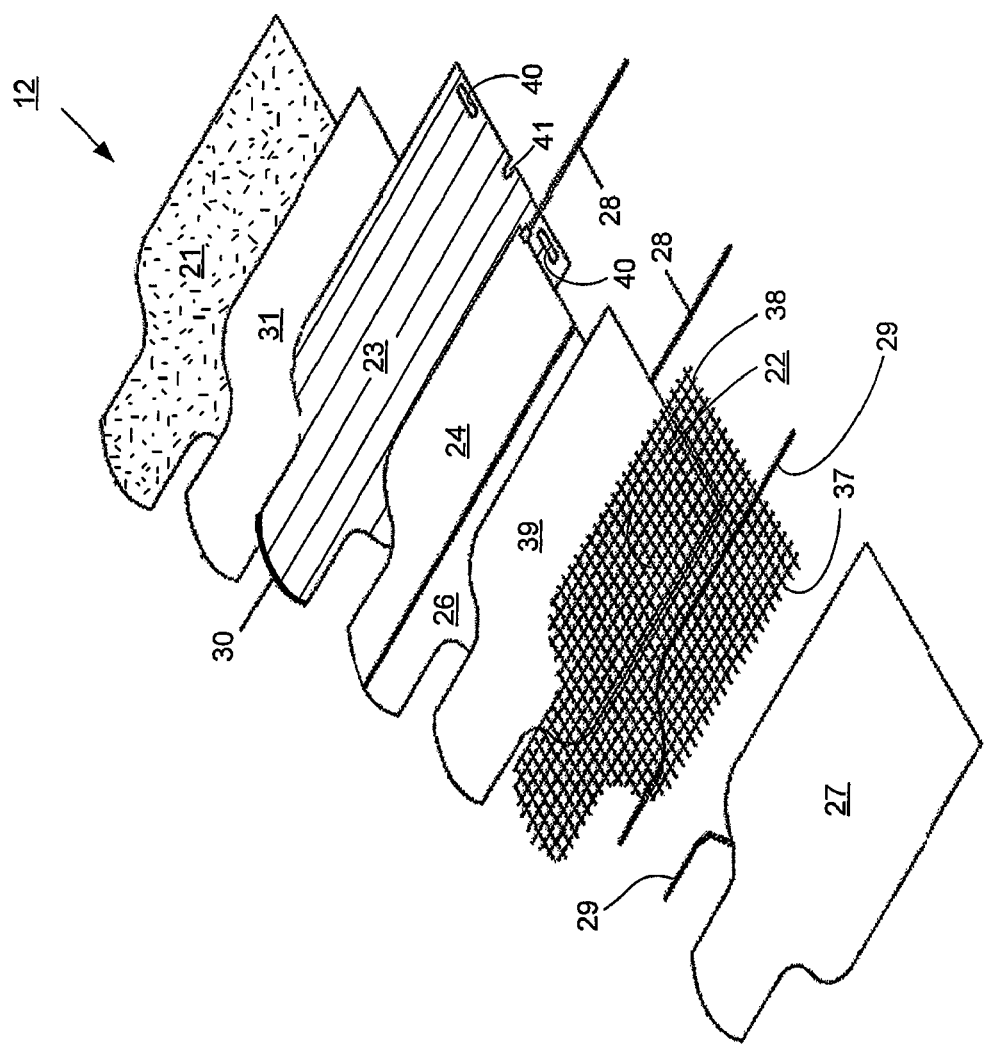
FIG. 2 is an exploded diagram of the various layers and components of the thermal image generator shown in FIG. 1.

FIG. 2 depicts exploded view of the various layers and components of the thermal image generator 12. Specifically, insulation 21 is the inner-most layer and forces heat to the front of thermal image generator 12. This may be obtained from XPEDP of Atlanta, Ga., as foam insulation 168034. Adhesive layer 31 connects insulation 21 to support structure 23. This may be obtained from FLEXcon Inc., of Spencer, Mass. as DFM 100 CLEAR V-63 150 POLY H-9 V-29 150 POLY H-9. Support structure 23 is for providing structural integrity to various parts of thermal image generator 12. Preferably, it is constructed of plastic corrugation. Most preferably, the plastic corrugation is 6 mm black matte finish Coroplast brand plastic corrugation, but other plastic material could be used. Coroplast® board may be obtained from, for example Montana Molding and Sign Supply of Billings, Mont. The corrugations preferably are run vertically as shown in FIG. 2 for vertical strength. Support structure 23 has a layer of caulk 30 on the uppermost edge to prevent the loss of heat through the corrugation spaces. Conventional black caulking, as available from any hardware store is preferred. The bottom portion of heat grid 22 is shorter than support structure 23 by approximately 3 inches. Support structure 23 preferably defines apertures 40 and notch 41. Collectively these are present to allow thermal image generator 12 to be placed in conventional target holding devices, and to do so without interference from heat grid 22. A conventional target holding device may be obtained from Meggitt Defense Systems of Minneapolis, Minn. under model number AA10.

First foil 24 and second foil 26 are discontinuous sections of foil. Preferably, these structures are made of aluminum. This may be obtained as 468, 213-L-TAPE from Lamart Corp. of Clifton, N.J. Functionally, they provide a method of spreading the heat evenly, so as to avoid hot spots generated by heat grid 22. Extending from the bottom of first foil 24 and second foil 26 are power leads 28. Power provided to system 10 could be AC or DC, preferably at 24 volts. As the person of ordinary skill in the art would understand, one of power leads 28 is voltage in whereas the other power lead 28 is voltage out. Power lead and plug may be obtained from Waytek Inc., of Chanhassen, Minn. under part number 37110. Power leads 28 are preferably crimped to first foil 24 and second foil 26.

Interface 39 is an electrical interface to keep heat grid 22 from touching first foil 24 and second foil 26. Interface 39 does not reach all the way to the outer edges of heat grid 22. This allows heat grid 22 to touch first foil 24 and second foil 26 along the outer edges. Interface 39 has adhesive on both sides to attach to first foil 24 and second foil 26 thereto, and, on the opposite side, to hold heat grid 22 in place. The interface with adhesive can be obtained from FLEXcon Inc., of Spencer, Mass. as DFM 100 CLEAR V-63 150 POLY H-9 V-29 150 POLY H-9.

Heat grid 22 is comprised of horizontal wires 37 and vertical wires 38. Horizontal wires 37 provide the heat-generating voltage. Different sizes are required to create the different heat zones, which are needed to provide a realistic thermal image. Preferably, there are a total of four different wire sizes; three different horizontal wires 37 (associated with head zone 20'", shoulder zone 20", and body zone 20') and vertical wire 38, which is not directly energized by voltage-in power lead 28. Preferably the gauges of the wires are 47, 45, 44 and 40 for head zone 20'", shoulder zone 20", body zone 20', and vertical wires respectively. Preferably, the wires are alloy type 60, and may be obtained from Pelican Wire Co., of Naples, Fla.

The resulting heat grid 22 pattern is preferably rectangular wherein horizontal wires 37 are approximately ½ inch apart, and vertical wires 38 are preferably approximately 1 inch apart. The resulting circuitry, as would be understood by the person of ordinary skill in the art, is that horizontal wires 37 create a parallel circuit, whereas non-powered vertical wires 38 provide an alternative electrical path in the event horizontal wires 37 are broken. This is one of the preferred structures of the present inventions and it enables thermal image generator 12 to continue functioning properly even in the event the integrity of thermal image generator 12 has been compromised by damage by projectiles such as bullets.

Connector strips 29 are preferably carbon filled adhesive strips that form a connection between heat grid 22, and first foil 24 and second foil 26. This may be obtained as part ARclad 8001 from Adhesive's Research of Glenn Rock, Pa.

Image layer 27 can be flat black or have an image. An image comprised of heat conductive material would not provide functionality in a thermal signature, however since system 10 could likewise be used as a target in various non-thermal applications, an image may be desired. Preferably, image layer 27 is an adhesive backed vinyl. This may be obtained as ORAJET #3165 from Montana Molding and Sign Supply of Billings, Mont.

Figure 3:
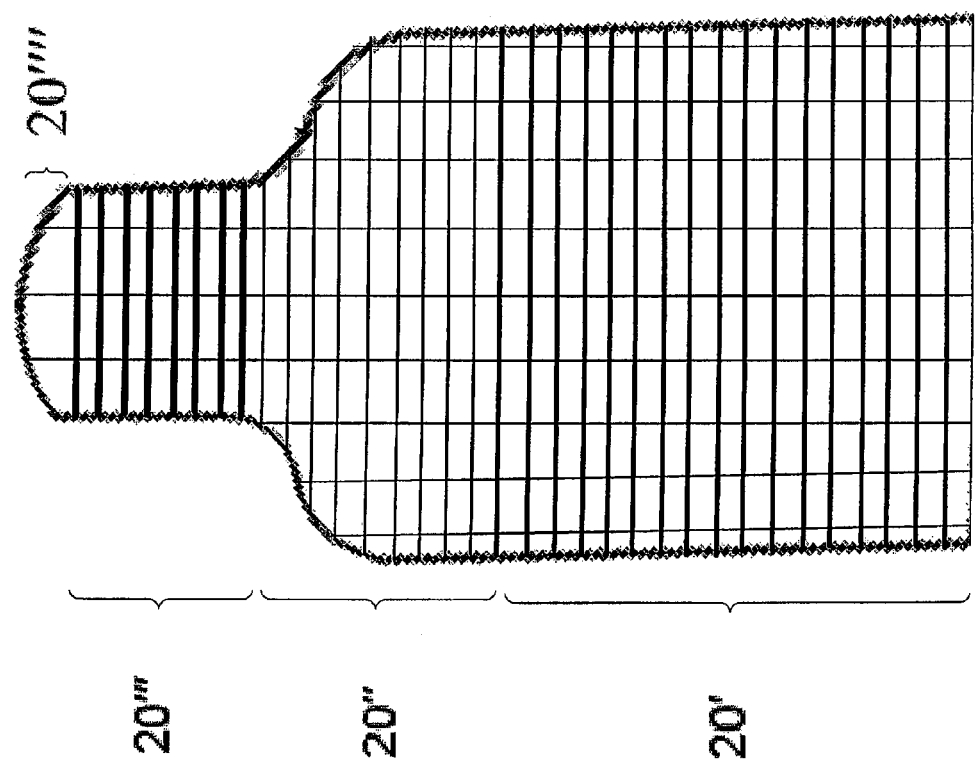
FIG. 3 is a front view of one embodiment of the thermal generator.

FIG. 3 depicts a front view of thermal image generator 12. As can be seen, the silhouette is generally shaped like a head with shoulders and body or torso below. Reference herein to the face should be understood to be part of head zone 20'''. Going from the top of the head downward, the respective zones are cap zone 20'''', head zone 20''', shoulder zone 20'', then body zone 20'. As discussed, the size of horizontal wires 37 vary, in order to differentially create zones 20' through 20'''. Preferably, on average and in most outdoor temperatures, head zone 20''' emits the most heat, shoulder zone 20'' emits the least heat, and body zone 20' is in the middle.

Voltage is applied via one of the power leads 28. In the most preferred embodiment cap zone 24' does not receive any voltage. While three zones, (head zone 20''', shoulder zone 20'', and body zone 20') are preferred, additional zones or different zones are considered within the scope of the invention. Moreover, while the zones depicted in FIG. 3 are differentiated linearly, the borders of the zones need not be horizontal or regular.

Figure 4:
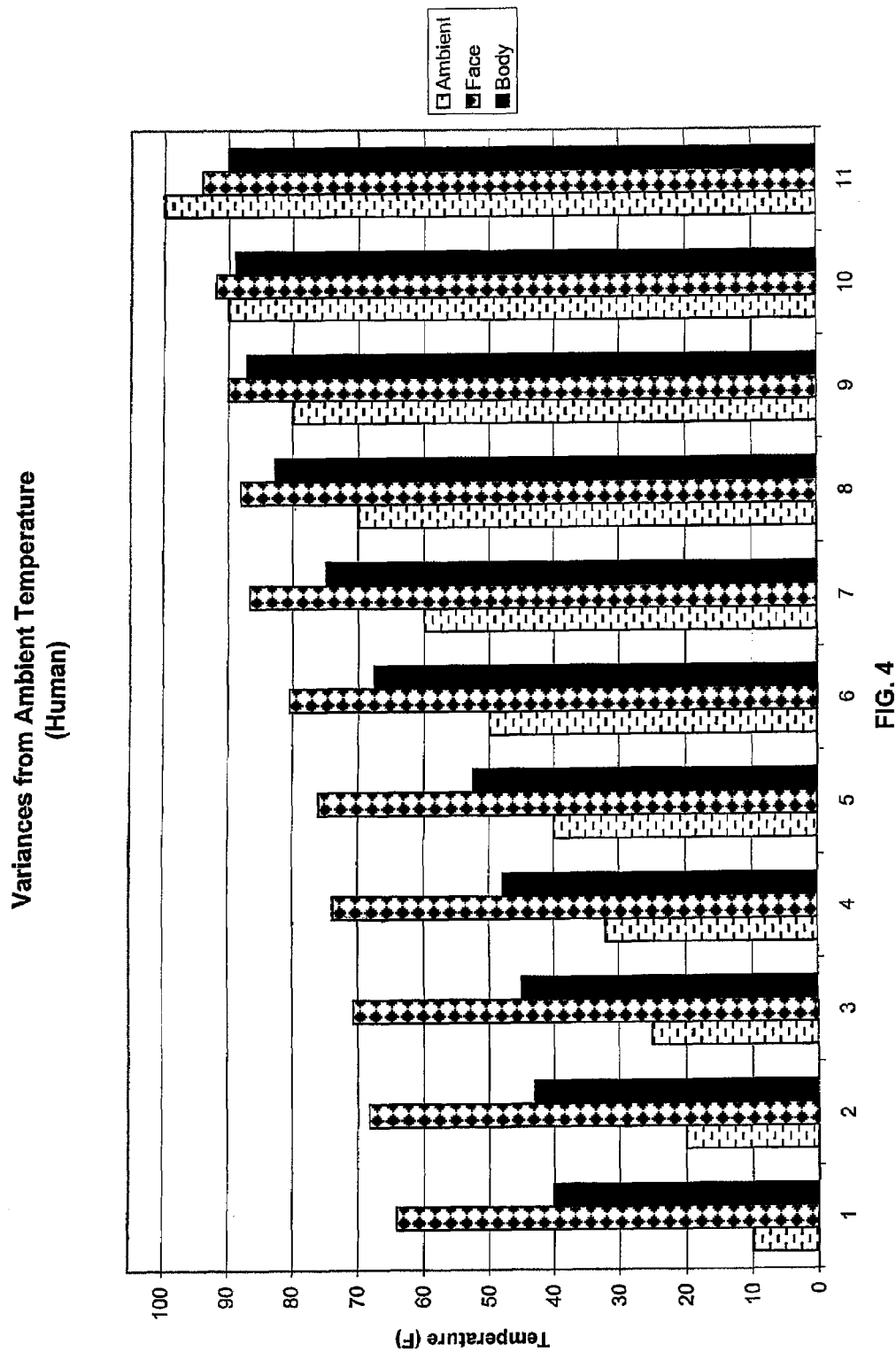
FIG. 4 is a graphical representation of how face and body temperatures vary according to ambient temperature.

FIG. 4 demonstrates how face temperature and body temperature, reflected as the checked and solid bars respectively, vary according to ambient temperature, which is reflected as the dashed bars. It is worth noting that face temperature remains higher than body temperature at the tested temperatures, except the difference between the two narrows as the ambient temperature gets higher. It is also worth noting that the ambient temperature is higher than the face and body temperature when the ambient temperature is 100° F.

Figure 5:
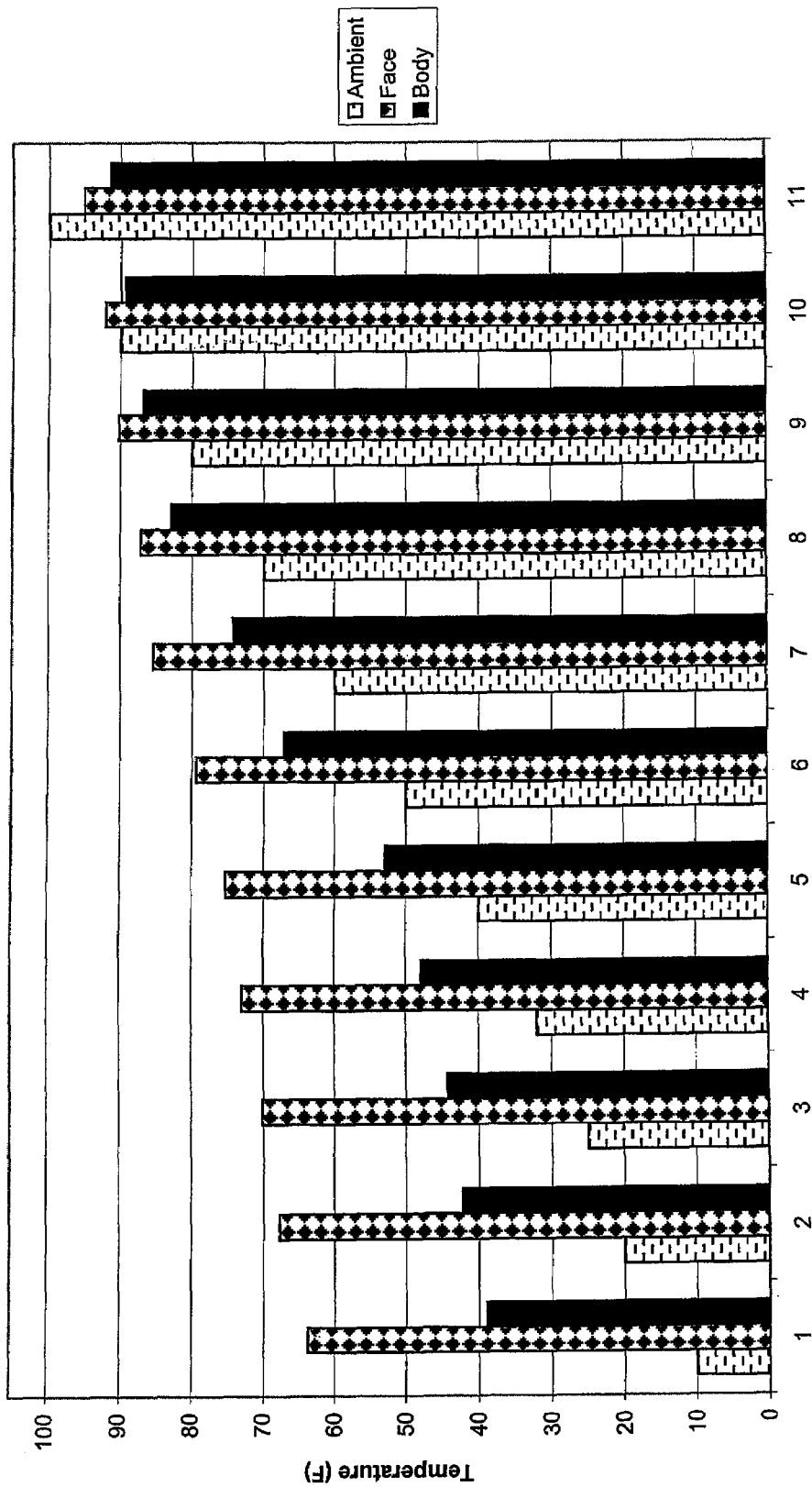
FIG. 5 is a graphical representation of the temperatures of face zone 20''' and body zone 20' at various ambient temperatures.

Referring to FIG. 5, this depicts the temperatures of face zone 20''' and body zone 20' at various ambient temperatures.

Figure 6:
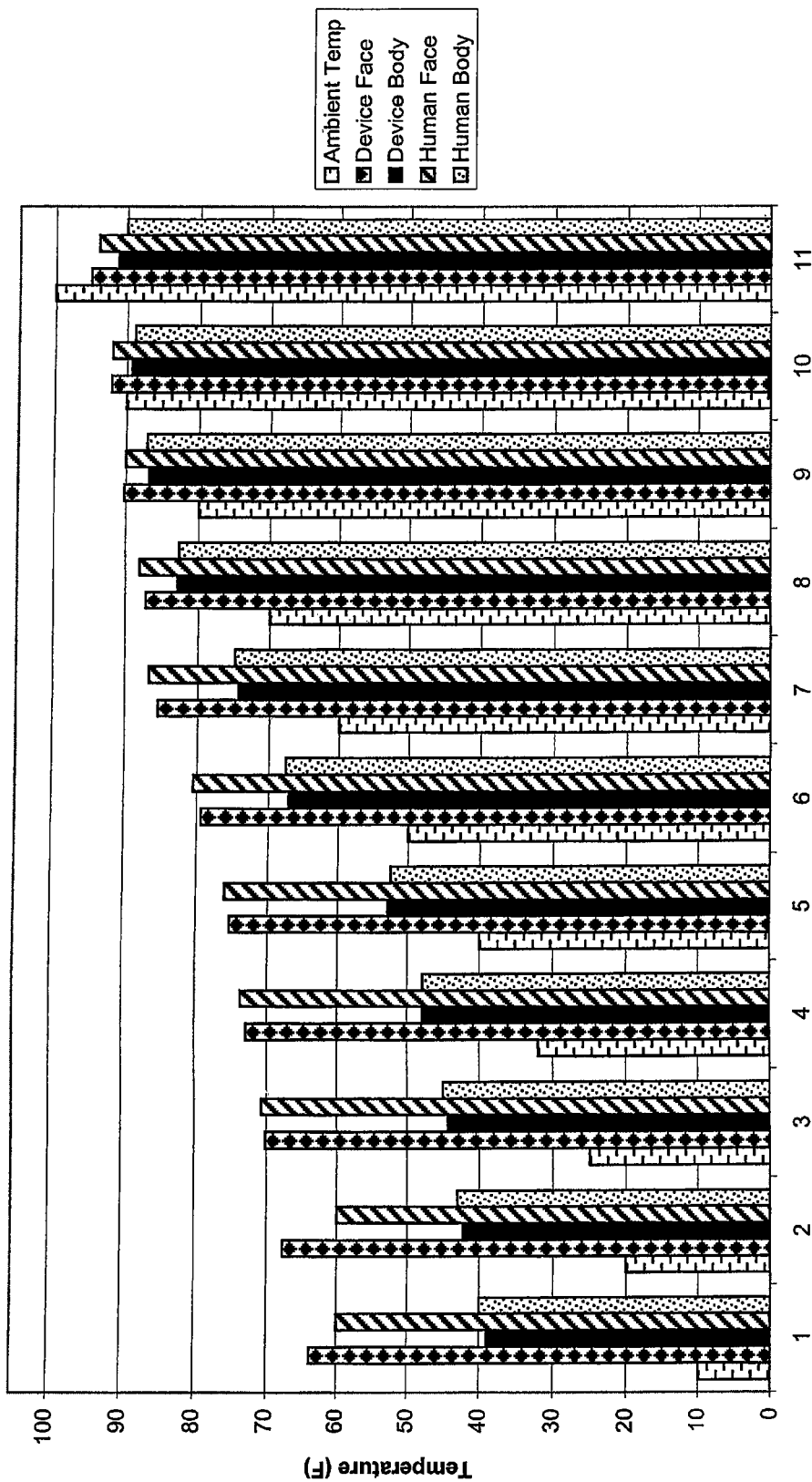
FIG. 6 is a graphical comparison of human face, device face zone 20''', human body and device body zone 20' at various ambient temperatures.

In comparing the temperatures generated by thermal image generator 12 and a clothed human subject, as set forth in FIG. 6, one can see that the measured values are extremely similar. Close correlation was sought, but it was unexpected that such close correlation could be achieved given the practical limitations of employing a simple and relatively inexpensive controller to emulate a complex, 3-dimensional animal on a 2-dimensional substrate.

Having established the accuracy of the device by showing the similarity of device and human temperatures at various ambient temperatures, the next correlation is the usefulness of the device as a function of accuracy and number of zones. Specifically, a desirable training device would employ the simplest design to achieve the best result. In this application, the best result could be the quickest and most accurate recognition of a human versus non-human target. This was determined by comparing the speed of recognition of a variety of heat signature targets, where those targets varied according to the number of zones and the percent similarity of temperature of those zones, as compared to an averaged human standard.

The various parameters for this analysis are set forth as follows:

Speed of recognition is expressed as a value between one and five with five being the fastest and most desirable, and one being no recognition, and therefore, not desirable. Five corresponds with recognition in less than 1.0 second. Four is recognition in 1.0 to <2.0 seconds. Three is recognition between 2.0 and 3.0 seconds. Two is recognition in >3.0 seconds. One is no recognition. Recognition is defined as greater or equal to 90% accuracy in identifying a signature as human.

Percent similarity to standard is calculated as the difference between the temperature of the standard and the actual temperature at a given ambient temperature, divided by the standard temperature, times 100. In other words:

$$\% \text{ Similarity} = ((\text{standard} - \text{actual})/\text{standard}) \times 100)).$$

Where a set of data has more than one zone, the applicable % similarity is the smallest percentage.

For example, if the data points corresponding with 4 zones have % similarity calculations of 40%, 35%, 40% and 45% (corresponding with the difference between the 4 zones and their corresponding body part), then the applicable % similarity would be 35% for this analysis.

The qualitative results are shown in Table 1 are as follows on a 1-5 scale with 5 being the fastest response time, 1 being the slowest response time, and 3 being an average response time:

TABLE 1

| | Speed of Recognition | | | | | |
|---|---|---|---|---|---|---|
| % Similarity to Standard | 1 Zone (Face Only) | 1 Zone (Body Only) | 2 Zones | 3 Zones | 4 Zones | 5 Zones |
| 100 | 3 | 4 | 4 | 5 | 5 | 5 |
| 90 | 3 | 4 | 4 | 5 | 5 | 5 |
| 80 | 3 | 3 | 4 | 5 | 5 | 5 |
| 70 | 3 | 2 | 3 | 5 | 5 | 5 |
| 60 | 3 | 2 | 3 | 5 | 5 | 5 |
| 50 | 3 | 2 | 2 | 4 | 4 | 4 |
| 40 | 2 | 2 | 2 | 3 | 3 | 3 |
| 30 | 2 | 1 | 2 | 3 | 3 | 3 |
| 20 | 2 | 1 | 2 | 2 | 2 | 2 |
| 10 | 1 | 1 | 1 | 1 | 1 | 1 |
| 0 | 1 | 1 | 1 | 1 | 1 | 1 |

Figure 7:
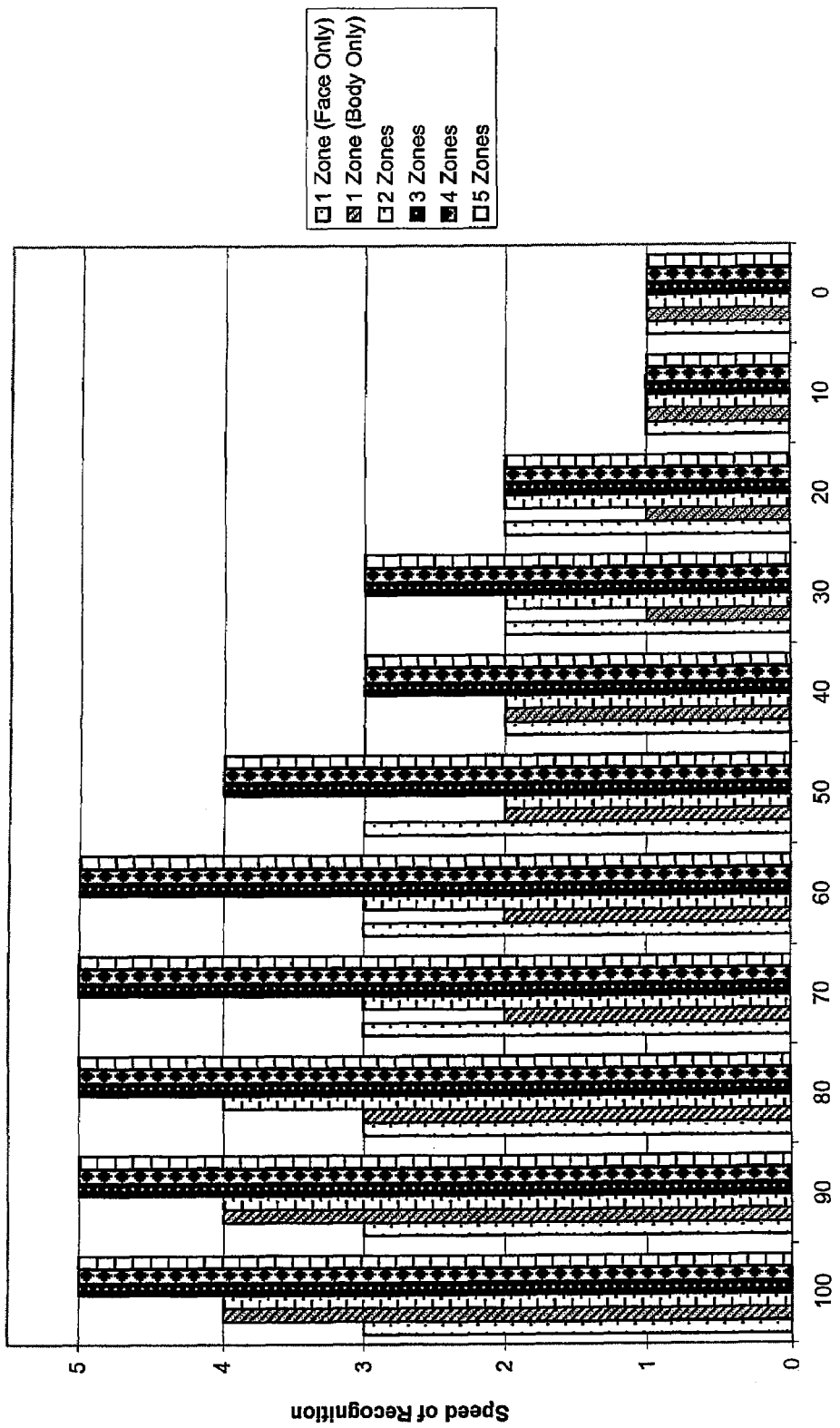
FIG. 7 is a graphical representation qualitatively representing how the number of zones and percent similarity of standard of temperature affects the speed of recognition.
Figure 8:
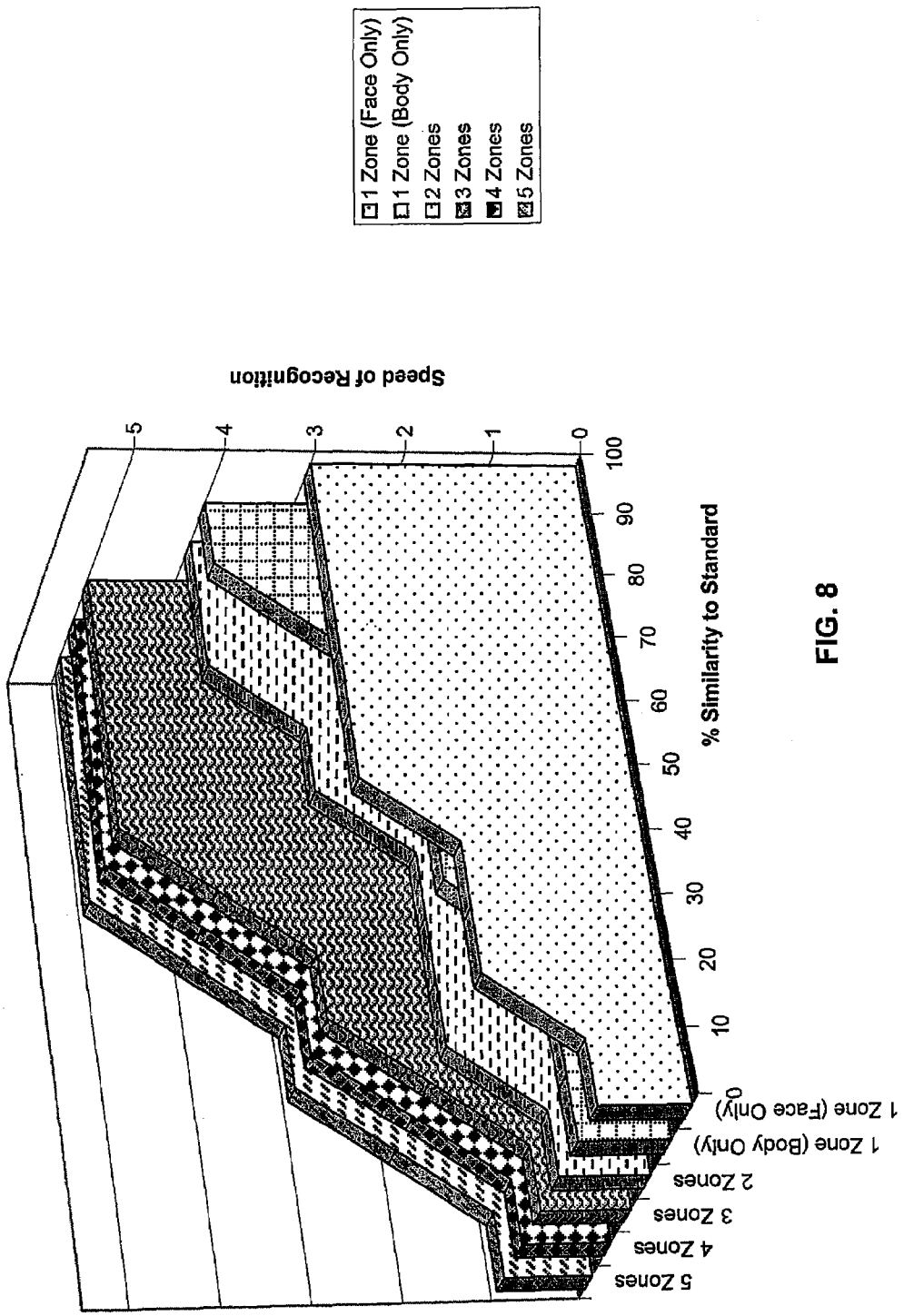
FIG. 8 is a graphical representation qualitatively representing how the number of zones and percent similarity of standard of temperature affects the speed of recognition.

FIGS. 7 and 8 graphically represent the data of Table 1. These tables illustrate how varying the number of zones in a device, and adjusting the temperatures of those zones according to the ambient temperature, affects the speed at which a user of the present inventions can recognize a signature as human. The data points for three zones, four zones and five zones are the same. Indeed, this provides another unexpected result of the present inventions wherein it appears to be of little or no benefit to employ greater than about three zones in a device for generating thermal signatures, for purposes of training, regardless of the percent similarity to standard temperature.

In operation, one would preferably attach thermal image generator 12 to a conventional target holding device using apertures 40 and notch 41. Controller 14 would be attached to thermal image generator 12 and turned on. After allowing thermal image generator 12 to adjust to proper temperature, one would view thermal image generator 12 through thermal image detector 16. Optionally one could employ overlay 32 with thermal stand-offs 34. Various training protocols could be utilized, for example distinguishing between human versus non-human signatures, distinguishing between friendly versus enemy combatants, speed of recognition, etc.

Certain modifications and improvements will occur to those skilled in the art upon a reading of the foregoing description. By way of example, it is possible to modify the device to accommodate 3-dimensional substrates. Also, it is possible to modify the device by changing the shape to accommodate alternative sources of thermal energy including human silhouette shapes in various poses, or specific silhouettes and temperature profiles of animals, equipment, buildings, and/or vehicles of interest. Also, the depiction of weapons and equipment that emit varying degrees of thermal energy may be modified to represent if they have been used recently (i.e. hot barrel of a weapon). Additionally, training and friendly/foe identification improvements are possible by employing combat identification devices with thermal image generator 12. Examples of combat identification devices include infrared reflective tape on the uniform or beacons that flash at specific wavelengths and/or pulses. It should be understood that all such modifications and improvements have been deleted herein for the sake of conciseness and readability, but are properly within the scope of the following claims.

We claim:

1. A thermal image generator comprising:
   (a) a support structure with a top surface;
   (b) first and second foil layers positioned side-by-side on the top surface of the support structure with a vertical gap between them;
   (c) a heat grid situated directly on top of the first and second foil layers that is comprised of a plurality of horizontal wires and vertical wires that span nearly the entire top surface of the support structure;
   (d) wherein the heat grid has outer edges, an interface layer between the heat grid and the first and second foil layers that does not reach to the outer edges of the heat grid, thereby allowing the outer edges of the heat grid to touch the first and second foil;
   (e) connector strips that run along the outer edges of the heat grid and that form a connection between the heat grid and the first and second foils;
   (f) wherein the heat grid has a top surface, an image layer that is adhered directly onto the top surface of the heat grid; and
   (g) a voltage in power lead crimped to the first foil and a voltage out power lead crimped to the second foil;
   wherein the heat grid has an outline, and the first and second foil layers are oriented to follow the outline of the heat grid; and
   wherein horizontal wires of the heat grid provide heat-generating voltage, and the vertical wires provide an alternative electrical path if a horizontal wire is broken.

2. The thermal image generator of claim 1, wherein the horizontal wires are approximately ½ inch apart, and the vertical wires are approximately one inch apart.

3. The thermal image generator of claim 1, wherein the connector strips are carbon-filled adhesive strips.

4. The thermal image generator of claim 1, wherein the image layer is comprised of an adhesive-backed vinyl.

* * * * *